(12) United States Patent
Phan

(10) Patent No.: US 12,433,718 B2
(45) Date of Patent: Oct. 7, 2025

(54) STRESS RELAXATION RESISTANT ORTHODONTIC APPLIANCES

(71) Applicant: Smylio Inc., Fremont, CA (US)

(72) Inventor: Loc Phan, Santa Clara, CA (US)

(73) Assignee: SMYLIO INC., Fremont, CA (US)

( * ) Notice: Subject to any disclaimer, the term of this patent is extended or adjusted under 35 U.S.C. 154(b) by 626 days.

(21) Appl. No.: 17/621,155

(22) PCT Filed: Jun. 19, 2020

(86) PCT No.: PCT/US2020/038833
§ 371 (c)(1),
(2) Date: Dec. 20, 2021

(87) PCT Pub. No.: WO2020/257725
PCT Pub. Date: Dec. 24, 2020

(65) Prior Publication Data
US 2022/0354622 A1 Nov. 10, 2022

Related U.S. Application Data

(60) Provisional application No. 62/863,868, filed on Jun. 19, 2019.

(51) Int. Cl.
A61C 7/08 (2006.01)
A61C 13/34 (2006.01)
(Continued)

(52) U.S. Cl.
CPC ............... A61C 7/08 (2013.01); A61C 13/34 (2013.01); B29C 51/002 (2013.01);
(Continued)

(58) Field of Classification Search
CPC .............................. A61C 2201/00; A61C 7/08
See application file for complete search history.

(56) References Cited

U.S. PATENT DOCUMENTS 2,496,387 A * 2/1950 Fink .................... A61K 6/90
524/297
4,551,486 A * 11/1985 Tateosian .............. C08F 291/00
525/903
(Continued)

FOREIGN PATENT DOCUMENTS

EP 1062278 A2 12/2000
WO 9945890 A1 9/1999
(Continued)

OTHER PUBLICATIONS

Fouquet, M., Supplementary European Search Report and Search Opinion issued by the European Patent Office for European patent application EP 20825576.0, May 17, 2023.
(Continued)

Primary Examiner — Cris L. Rodriguez
Assistant Examiner — Courtney N Huynh
(74) Attorney, Agent, or Firm — MT HUNT LAW; Marcus T. Hunt

(57) ABSTRACT

Orthodontic appliances formed from a material that includes an interpenetrating polymer network or semi-interpenetrating polymer network material to prevent or reduce stress relaxation of the material during use by a patient. Methods for forming orthodontic appliances from a material that includes from an interpenetrating polymer network or semi-interpenetrating polymer network material to prevent or reduce stress relaxation of the material during use by a patient.

4 Claims, 2 Drawing Sheets

(51) Int. Cl.
  *B29C 51/00* (2006.01)
  *B29C 51/30* (2006.01)
  *B29L 31/00* (2006.01)

(52) U.S. Cl.
  CPC .......... *A61C 2201/00* (2013.01); *B29C 51/30* (2013.01); *B29L 2031/753* (2013.01)

(56) References Cited

U.S. PATENT DOCUMENTS

| | | | |
|---|---|---|---|
| 5,502,087 A | 3/1996 | Tateosian et al. | |
| 5,783,633 A * | 7/1998 | Sperling | C08L 9/00 |
| | | | 525/131 |
| 5,975,893 A | 11/1999 | Chishti et al. | |
| 6,450,807 B1 | 9/2002 | Chishti et al. | |
| 6,720,402 B2 | 4/2004 | Langer et al. | |
| 8,883,915 B2 | 11/2014 | Myung et al. | |
| 2001/0041320 A1 | 11/2001 | Phan et al. | |
| 2003/0055198 A1 | 3/2003 | Langer et al. | |
| 2009/0136893 A1 * | 5/2009 | Zegarelli | A61C 19/066 |
| | | | 433/80 |
| 2016/0236398 A1 * | 8/2016 | Phan | B29C 51/002 |
| 2018/0229436 A1 * | 8/2018 | Gu | B29C 64/124 |

FOREIGN PATENT DOCUMENTS

| | | |
|---|---|---|
| WO | 2011163070 A1 | 12/2011 |
| WO | 2012027678 A1 | 3/2012 |
| WO | WO-2018115128 A1 * | 6/2018 ........... A61K 9/0012 |

OTHER PUBLICATIONS

Klempner et al., Interpenetrating Polymer Networks Advances in Chemistry; American Chemical Society: Washington, DC, 1994.

Roland, Interpenetrating Polymer Networks (IPN): Structure and Mechanical Behavior; Encyclopedia of Polymeric Nanomaterials, 2013.

Nakamura et al., Nontoxic organic solvents identified using an a priori approach with Hansen solubility parameters, Chem. Commun., 2017, 53, 4096-4099.

* cited by examiner

STRESS RELAXATION RESISTANT ORTHODONTIC APPLIANCES

CROSS-REFERENCE TO RELATED APPLICATIONS

This application is a national stage application pursuant to 35 U.S.C. § 371 of International Application No. PCT/US20/38833, filed Jun. 19, 2020, which claims the benefit of U.S. Provisional Application No. 62/863,868, filed Jun. 19, 2019, which is incorporated by reference. This application incorporates the aforementioned references herein.

FIELD OF THE INVENTION

The subject matter of the present disclosure relates generally to the field of orthodontic devices. More particularly, the present disclosure relates to user removable orthodontic devices.

BACKGROUND

An objective of orthodontics is to move a patient's teeth to positions where function and/or aesthetics are optimized. Traditionally, appliances such as braces are applied to a patient's teeth by a treating practitioner and the set of braces exerts continual force on the teeth and gradually urges them toward their intended positions. Over time and with a series of clinical visits and reactive adjustments to the braces by the practitioner, the appliances to move the teeth toward their final destination.

More recently, alternatives to conventional orthodontic treatment with traditional affixed appliances (e.g., braces) have become available. For example, systems including a series of molded plastic aligners have become commercially available from Align Technology, Inc., San Jose, Calif., under the trade name Invisalign® System. The Invisalign® System is described in numerous patents and patent applications assigned to Align Technology, Inc. including, for example in U.S. Pat. Nos. 6,450,807, and 5,975,893.

The Invisalign® System typically includes designing and fabricating multiple aligners to be worn by the patient before the aligners are administered to the patient and used to reposition the teeth (e.g., at the outset of treatment). Often, designing and planning a customized treatment for a patient makes use of computer-based 3-dimensional planning/design tools. The design of the aligners relies on computer modeling of the patient's teeth in a series of planned successive tooth arrangements, and the individual aligners are designed to be worn over the teeth, such that each aligner exerts force on the teeth and elastically repositions the teeth to each of the planned tooth arrangements.

Prior art orthodontic appliances are typically constructed from a single (or multiple non-interpenetrating polymers) and suffer from stress relaxation of the material(s). Such appliances are formed primarily from single strand thermoplastic polymers are used, which have unrestrained polymer chains that are subject to stress relaxation. As a result, it is typically required to have aligners changed out on a weekly basis and manufacturers have to program some overshoot into appliances to account for stress relaxation, which are undesired qualities for an appliance.

SUMMARY OF THE INVENTION

Embodiments of the invention relate to orthodontic appliances, systems, and methods of use as summarized in the following paragraphs. Some embodiments relate to orthodontic appliances that maximize working elasticity.

Some embodiments relate to an orthodontic appliance having an interpenetrating polymer network (IPN) material that can be formed from multiple cross-linked polymers.

Some embodiments relate to an orthodontic appliance having a semi-interpenetrating polymer network (SIPN) material that can be formed from a first cross-linked polymer and a second non-crosslinked polymer.

In some embodiments, a plasticizing solvent can be configured to leak out of the IPN or SIPN materials for gradually reducing flexibility of the orthodontic appliance after creation.

Some embodiments relate to a method for forming an orthodontic appliance. The method includes obtaining a mold of a physical tooth model, thermoforming a material over the mold for form the shape of the orthodontic appliance, and cross-linking a portion of the material after forming the shape of the orthodontic appliance to change the material into a semi-interpenetrating polymer network material.

Some embodiments relate to a method for forming an orthodontic appliance. The method includes obtaining a mold of a physical tooth model, and thermoforming a thermoformable interpenetrating polymer network material using the mold to form the orthodontic appliance.

BRIEF DESCRIPTION OF THE DRAWINGS

For a better understanding of at least certain embodiments, reference will be made to the following Detailed Description, which is to be read in conjunction with the accompanying drawings.

Figure 1:
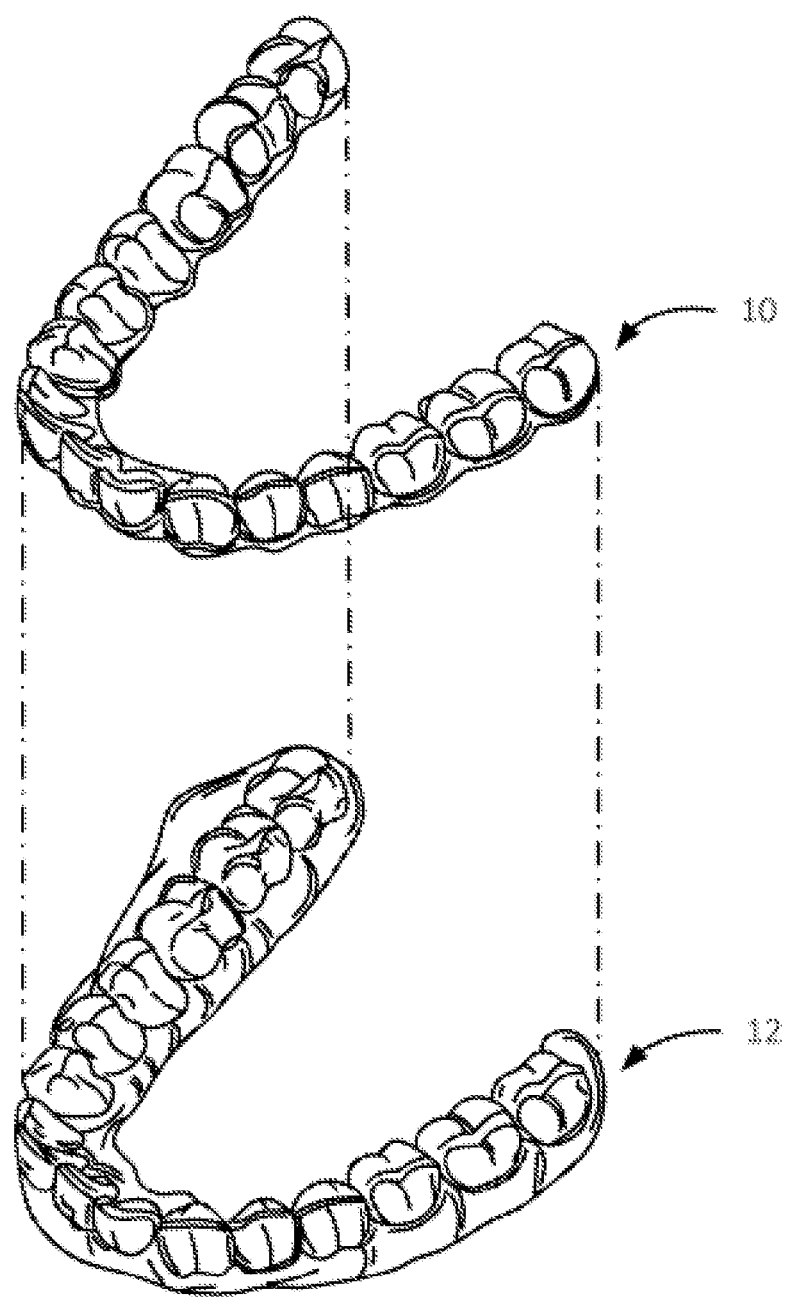
FIG. 1 is a perspective view of a jaw and an orthodontic appliance, according to some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Embodiments are disclosed that relate to orthodontic appliances constructed interpenetrating polymer network (IPN) or semi-interpenetrating polymer network (SIPN) formed from multiple polymers. The use of such materials can address stress relaxation problems that thermoformed materials suffer due to having a non-crosslinked structure. Possible benefits include reducing the number of orthodontic appliances used in a therapeutic series, and providing a more exact orthodontic appliances that does not require overshoot in design parameters and can reach the final therapeutic target as intended.

Before the present invention is described in greater detail, it is to be understood that this invention is not limited to particular embodiments described, as such can, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

FIG. 1 provides an appropriate starting point in a detailed discussion of various embodiments of the present invention with respect to tooth repositioning appliances designed to apply repositioning forces to teeth. An orthodontic appliance 10 can be worn by a patient in order to achieve an incremental repositioning of individual teeth in the jaw 12. The orthodontic appliance 10 can include a shell having teeth-receiving cavities that receive and resiliently reposition the teeth. In some embodiments, a polymeric appliance can be formed from a sheet of suitable layers of polymeric material. An appliance can fit over all teeth present in an upper or lower jaw, or less than all of the teeth.

In some embodiments, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual anchors on teeth with corresponding receptacles or apertures in the appliance so that the appliance can apply a selected force on the tooth. Basic methods for determining an orthodontic treatment plan using a series of incremented appliances as well as instructions for molding orthodontic appliances, are described in U.S. Pat. Nos. 6,450,807, and 5,975,893, which are incorporated by reference herein, but only to an extent that those patents do not contradict the newer teachings disclosed herein.

An appliance can be designed and/or provided as part of a set of a plurality of appliances. In such an embodiment, each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

The orthodontic appliances can be generated all at the same stage or in sets or batches, e.g., at the beginning of a stage of the treatment, and the patient wears each appliance until the pressure of each appliance on the teeth can no longer be felt or has resulted in the maximum amount of expressed tooth movement for that given stage. A plurality of different appliances (e.g., set) can be designed and even fabricated prior to the patient wearing any appliance of the plurality. After wearing an appliance for an appropriate period of time, the patient replaces the current appliance with the next appliance in the series until no more appliances remain. The orthodontic appliances are generally not affixed to the teeth and the patient may place and replace the appliances at any time during the procedure (e.g., patient-removable appliances).

The final orthodontic appliance or several appliances in the series may have a geometry or geometries selected to overcorrect the tooth arrangement, i.e., have a geometry which would (if fully achieved) move individual teeth beyond the tooth arrangement which has been selected as the "final." Such over-correction may be desirable in order to offset potential relapse after the repositioning method has been terminated, i.e., to permit movement of individual teeth back toward their pre-corrected positions. Over-correction may also be beneficial to speed the rate of correction, i.e., by having an appliance with a geometry that is positioned beyond a desired intermediate or final position, the individual teeth will be shifted toward the position at a greater rate. In such cases, the use of an appliance can be terminated before the teeth reach the positions defined by the appliance.

The appliance can have thicknesses ranging from 0.001-0.030 inches thick, and can be constructed from a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof.

To counter issues with stress relaxation, an orthodontic aligner can be formed from a material having an interpenetrating polymer network (IPN) or semi-interpenetrating polymer network (SIPN) formed from multiple polymers. Details and methods for forming IPNs and SIPNs are disclosed by Klempner et al., *Interpenetrating Polymer*

*Networks Advances in Chemistry*; American Chemical Society: Washington, D C, 1994, Roland, *Interpenetrating Polymer Networks (IPN): Structure and Mechanical Behavior*; Encyclopedia of Polymeric Nanomaterials, 2013, U.S. Pat. No. 8,883,915B2, and U.S. Pat. No. 6,720,402B2, which are incorporated by reference. Simplistically, an IPN is two or more networks of polymers that are at least partially interlaced (chemically or physically) and are inseparable. A SIPN is similarly structured, however one of the polymers is linear in structure and can be separated from the network, e.g., by the use of solvents.

Prior art orthodontic appliances are typically constructed from a single (or multiple non-interpenetrating polymers) and suffer from stress relaxation of the material(s). Such appliances are formed primarily from single strand thermoplastic polymers are used, which have unrestrained polymer chains that are subject to stress relaxation. As a result, it is typically required to have appliances changed out on a weekly basis and manufacturers must program some overshoot into appliances to account for stress relaxation. Often, appliances are unable to reach a final desired position due to stress relaxation.

Orthodontic appliances formed from IPNs and SIPNs are much more resistant to stress relaxation because of the interpenetrating polymers are restrained. Hence, the primary mode of failure found in thermoplastics is avoided as well as avoiding the need to cross-link all or portions of a non-interpenetrating polymer, which can result in brittleness and loss of elasticity. Depending on the formulation, IPNs and SIPNs also can provide advantages of disparate polymer physical characteristics, such as elasticity and transparence.

In some embodiments, orthodontic appliances formed from IPNs and SIPNs can also be modified with a solvent plasticizer, such as a biocompatible solvent (e.g., limonene, eugenol). Such solvents are described by Nakamura et al., *Nontoxic organic solvents identified using an a priori approach with Hansen solubility parameters*, Chem. Commun., 2017, 53, 4096-4099, which is incorporated by reference. The inclusion of the solvent can provide an initial flexibility that helps relieve patient discomfort. The appliance can be configured to slowly leak the solvent out (e.g., over 1-3 days), which causes the appliance to gradually strengthen and eases the patient into the therapeutic protocol rather than providing an abrupt and possible painful treatment.

Figure 2:
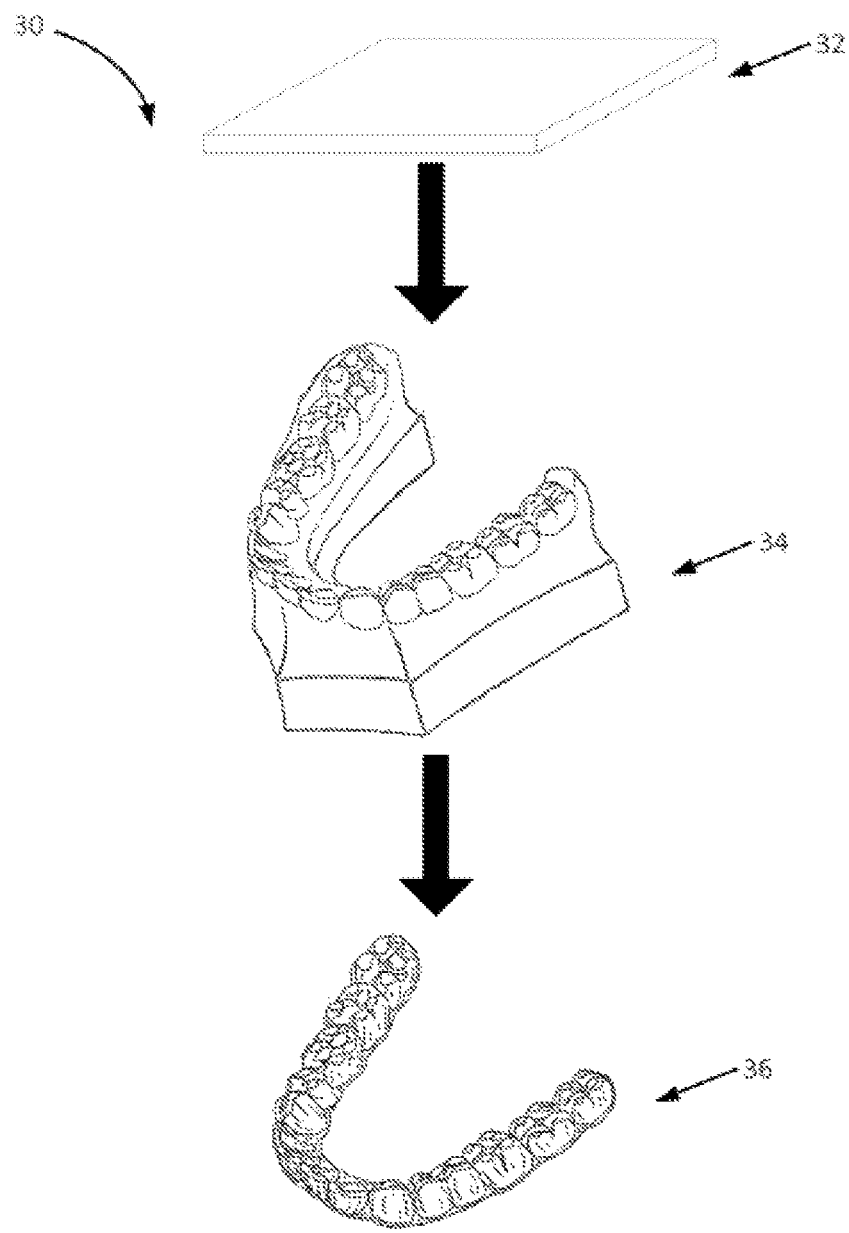
FIG. 2 is a perspective view of a process for molding an orthodontic appliance, according to some embodiments.

FIG. 2 depicts an example of a basic process 30 for forming an orthodontic appliance. As shown, a thermoformable IPN or SIPN material 32 can be formed into an orthodontic appliance 36. The material 32 can be of one layer to form a single shell or multiple non-affixed layers of material to form multiple shells at once. In this example process, the orthodontic appliance 36 can be produced with the use of a physical tooth model, or mold, 34. The orthodontic appliance 36 can be produced by heating the thermoformable material 32 and then vacuum or pressure forming the material over the teeth in the physical tooth model 34. The orthodontic appliance 36 is a direct representation of the physical tooth model.

Some IPNs are thermoformable and can be used with the noted method. Thermoplastic IPN materials are hybrids between polymer blends and IPNs that involve physical cross-links rather than chemical cross-links. Such materials flow at elevated temperatures, like a thermoplastic material, and at use temperature are cross-linked and behave like IPNs. Types of cross-links include block copolymer morphologies, ionic groups, and semi-crystallinity.

Many IPNs, such as sequential or simultaneously formed IPNs, are thermoset materials that cannot be molded after formation. For such materials, the base monomers and crosslinkers that make up the IPN may be required to be injection molded.

A SIPN can be formed from the established thermoforming based method, where the material 32 includes a thermoformable polymer used to form the shape of the orthodontic appliance 36. The thermoformable polymer is in strand form and the material 32 also includes a non-crosslinked monomer. After the thermoforming step, the monomer can be crosslinked (e.g., by UV or/or heat) to form the semi-interpenetrating polymer structure with the strand form polymer.

The monomer or monomer formulation can be mixed with an initiator that is activated by UV or by heat or both. A solvent that is compatible with polymer and is miscible with the monomer formulation can carry the monomer into the matrix to create the interpenetrating network. It may be necessary to wash or extract un-reacted monomers from the finished aligners. In some embodiments, a silicone prepolymer and acrylate modified silicone monomer with platinum catalyst might be usable without such an extraction step.

One or a series of physical tooth models, such as the model described above, may be used in the generation of elastic repositioning appliances for orthodontic treatment. Similar to the process above, each of the appliances can be generated by thermoforming a multilayer polymeric material over a mold of a desired tooth arrangement to form a dental appliance. The tooth positioning appliance of the desired tooth arrangement generally conforms to a patient's teeth but is slightly out of alignment with the initial tooth configuration. Placement of the elastic positioner over the teeth applies controlled forces in specific locations to gradually move the teeth into the desired configuration. Repetition of this process with successive appliances comprising new configurations eventually moves the teeth through a series of intermediate configurations to a final desired configuration.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should be judged in terms of the claims, which follow as well as the legal equivalents thereof.

What is claimed is:

1. An orthodontic appliance comprising:
a shell shaped to receive and reposition teeth, wherein the shell comprises an interpenetrating polymer network (IPN) material formed from multiple cross-linked polymers,
wherein a plasticizing solvent is configured to leak out of the IPN material over 1-3 days so as to gradually strengthen and reduce flexibility of the shell of the orthodontic appliance over the 1-3 days.

2. The orthodontic appliance of claim 1, wherein the plasticizing solvent is a biocompatible solvent.

3. A method for forming an orthodontic appliance that comprises i) a shell shaped to receive and reposition teeth, wherein the shell comprises an interpenetrating polymer network (IPN) material formed from multiple cross-linked polymers; and ii) a plasticizing solvent configured to leak out of the IPN material over 1-3 days so as to gradually strengthen and reduce flexibility of the shell of the orthodontic appliance over the 1-3 days, the method comprising:

obtaining a mold of a physical tooth model; and thermoforming a thermoformable IPN material using the mold to form the orthodontic appliance; and modifying the orthodontic appliance with the plasticizing solvent such that the orthodontic appliance is configured to slowly leak the plasticizing solvent out over 1-3 days to gradually strengthen and reduce flexibility of the IPN material and the orthodontic appliance over the 1-3 days.

4. The method of claim 3, wherein the plasticizing solvent is a biocompatible solvent.

\* \* \* \* \*